US012730816B2

(12) United States Patent
Gupta et al.

(10) Patent No.: US 12,730,816 B2
(45) Date of Patent: Sep. 8, 2026

(54) IDENTIFYING DATABASE RECORDS ASSOCIATED WITH A TARGET

(71) Applicant: SAP SE, Walldorf (DE)

(72) Inventors: Yadesh Gupta, Gurgaon (IN); Anshul Kumar, Gurgaon (IN); Shwetabh Goel, Gurgaon (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/811,325

(22) Filed: Aug. 21, 2024

(65) Prior Publication Data

US 2026/0056955 A1 Feb. 26, 2026

(51) Int. Cl.

*G06F 16/2455* (2019.01)
*G06F 16/21* (2019.01)
*G06F 16/23* (2019.01)
*G06F 16/248* (2019.01)

(52) U.S. Cl.

CPC ...... *G06F 16/24561* (2019.01); *G06F 16/214* (2019.01); *G06F 16/2358* (2019.01); *G06F 16/248* (2019.01)

(58) Field of Classification Search

CPC ............. G06F 16/24561; G06F 16/214; G06F 16/2358; G06F 16/248

See application file for complete search history.

(56) References Cited

U.S. PATENT DOCUMENTS

2010/0153417 A1* 6/2010 Rasmussen ........... G06F 16/242 707/758
2011/0295860 A1* 12/2011 Dewar .................. G06Q 10/06 707/752
2019/0317645 A1* 10/2019 BaderEddin .......... G06F 3/0482 707/752
2024/0220063 A1* 7/2024 Sutrave ................. G06F 3/0481 707/752
2025/0077602 A1* 3/2025 Khan .................. G06F 16/9535 707/752
2025/0245438 A1* 7/2025 Tsai ........................ G06F 40/30 707/752
2025/0258803 A1* 8/2025 Liu ....................... G06F 16/283 707/752

OTHER PUBLICATIONS

Martineau, Kim, "What is retrieval-augmented generation?", IBM Research, [Online]. Retrieved from the Internet: URL: https: research. ibm.com blog retrieval-augmented-generation-RAG, (Aug. 22, 2023), 8 pgs.

* cited by examiner

*Primary Examiner* — Yuk Ting Choi
(74) *Attorney, Agent, or Firm* — SCHWEGMAN LUNDBERG & WOESSNER, P.A.

(57) ABSTRACT

Various examples are directed to systems and methods for identifying records at a database corresponding to a target determination object. A system may access request data that indicates a source table at the database and a target determination object. The system may use stored knowledge data to generate first prompt data comprising at least one prompt to be provided to a trained computerized model to cause the trained computerized model to return a set of determination paths to the target determination object and execute the trained computerized model using the first prompt data. The system may determine a set of records from the source table that are associated with the target determination object using the set of determination paths.

17 Claims, 8 Drawing Sheets

IDENTIFYING DATABASE RECORDS ASSOCIATED WITH A TARGET

BACKGROUND

A database management system (DBMS) can be implemented as part of a suite of software applications that execute together. For example, the DBMS may support various client processes that utilize the DBMS to manage data. In some examples, a DBMS is implemented with a suite of processes that implement an enterprise resource planning (ERP) software solution. An ERP software solution may include one or more ERP applications. The ERP applications execute in conjunction with the DBMS to manage various different aspects of business operations. An example ERP software solution is the S/4 HANA product available from SAP SE of Walldorf, Germany.

BRIEF DESCRIPTION OF DRAWINGS

The present disclosure is illustrated by way of example and not limitation in the following figures.

DETAILED DESCRIPTION

Figure 1:
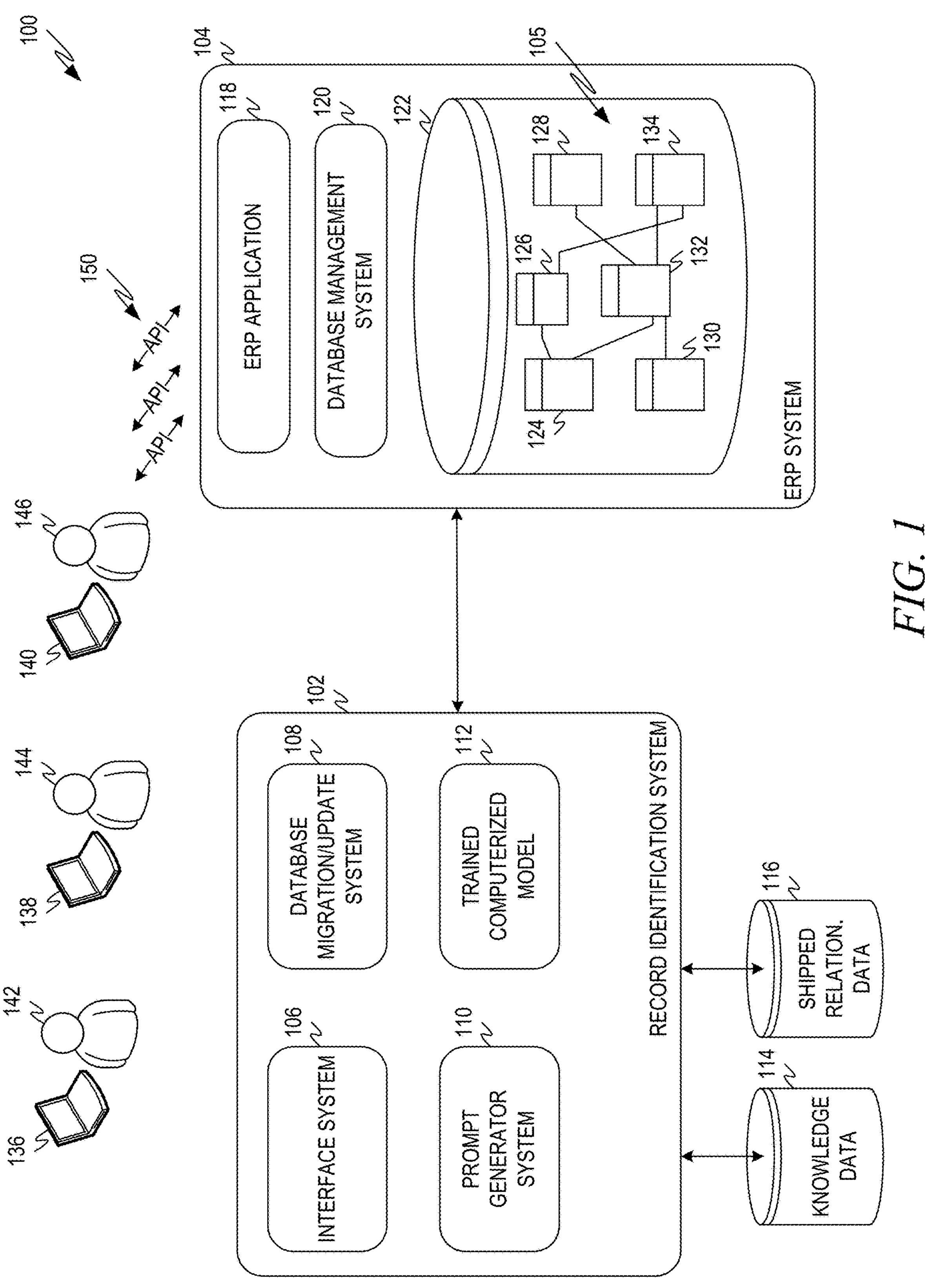
FIG. 1 is a diagram showing one example of an environment including a record identification system and the enterprise resource planning (ERP) system.

Enterprise resource planning (ERP) applications generate and utilize the data stored at the one or more database management systems (DBMS) to perform different enterprise operations. For example, an ERP application supporting a human resources operation may store employee records at the DBMS. The human resources ERP application may perform various tasks such as, for example, managing payroll, benefits, and/or the like. An example ERP application supporting accounting may use records managed by the DBMS to perform various accounting-related tasks such as posting transactions, reconciling accounts, and/or the like. An ERP application supporting operations may manage and generate various purchase orders, shipping orders, and/or the like to manage manufacturing or other operations.

ERP applications may utilize tables at the DBMS to store various enterprise data. For example, tables at the DBMS may be divided into rows and columns. Each row of a table may be referred to as a record. Each record may have multiple fields, where each field of a record corresponds to a column of the table including the record. Consider the example human resources ERP application described above. Such an ERP application may utilize an example employee table at the DBMS having records corresponding to employees and columns/fields corresponding to employee attributes such as, name, address, position, salary, and/or the like. Fields of a record may be filled or unfilled. A field of a record is filled if the field includes data. The field of a record is unfilled if the field does not contain data or if the field contends nonce or placeholder data.

Database records used by ERP applications may be associated with various determination objects. A determination object is a category of data. In the context of an ERP application, determination objects may be associated with organizational units of the customer enterprise (e.g., the business enterprise utilizing the ERP application). For example, records used by a human resources ERP application may be associated with one or more determination objects corresponding to the enterprise subunits employing respective employees. Records used by an operations ERP application may be associated with one or more determination objects corresponding to the enterprise subunits manufacturing, selling, and/or otherwise processing goods and services.

It is sometimes desirable to identify DBMS records associated with the particular determination object. Consider an example in which a customer enterprise is transitioning between different ERP application solutions. The customer enterprise may need to identify records corresponding to different enterprise subunits to incorporate the items correctly into the schema of the DBMS used by the target ERP application. Consider another example in which the customer enterprise divests a subunit. The customer enterprise may want to identify records corresponding to the divested subunit so that those records can be deleted and/or transferred to the purchaser of the subunit. Consider another example in which the customer enterprise conducts a reorganization of subunits. In this scenario, the customer enterprise may want to modify the storage of records based on newly associated business subunits.

In some examples, a DBMS record used by an ERP application includes a field or fields indicating one or more determination objects associated with the record. For example, a human resources ERP record may include a field indicating the customer enterprise subunit employing each of the indicated employees. It may be inefficient, however, to include fields for every determination object in association with every record. Such an arrangement would greatly increase the number of columns in each table, thereby decreasing the efficiency with which the DBMS and ERP application can operate.

Accordingly, in some examples, the ERP application and/or DBMS may utilize determination paths to identify records associated with a particular determination object. A determination path describes a relationship between a source table and a target determination object. The source table may be associated with a source determination object indicated by a column of the source table. Accordingly, records in the source table may have a field corresponding to the source determination object. The determination path may relate the source determination object to the target determination object via one or more additional tables.

Consider an example operations ERP application having a material table with records describing materials in stock. An example request may be made to identify records from the material table that are associated with a particular company, where the particular company is a subunit of the customer enterprise. In this example, the material table includes a column indicating a valuation area associated with each material record. A first intermediate table may include a column corresponding to valuation area and another column corresponding to physical plant. A second intermediate table may include a column corresponding to physical plant and a column corresponding to company. Accordingly, to identify records from the material table corresponding to the company, the ERP application and/or DBMS may find the company associated with each valuation area listed in the material table via the first and second intermediate tables.

In some examples, the ERP application may ship with predefined determination paths between commonly used determination objects. In this way, the ERP application may be able to identify records corresponding to commonly used determination objects. In some examples, however, as an ERP application is used and developed, the structure of the customer enterprise may change. Also, the schema or other structure of the ERP application may change. Further, the complexity of the schema used by the DBMS may make it difficult to pre-generate determination paths for all desirable combinations of determination objects.

Various examples address these and other challenges by utilizing a trained computerized model, such as a large language model (LLM), to discover determination paths in an ERP system. A record identification system may access request data that specifies a source table or tables at the DBMS and a target determination object. The record identification system may use stored knowledge data describing the customer organization to generate prompt data. The prompt data may be used to prompt the trained computerized model to generate a set of determination paths. The set of determination paths may be between determination objects corresponding to columns of the source table and a target column of a target table, where the target column comprises an indication of the target determination object.

The record identification system may be further configured to determine a best fit determination path from the set of determination paths generated by the trained computerized model. For example, the record identification system may be trained to rate determination paths from the set of determination paths with an efficiency score and/or an accuracy score. The efficiency score may reflect the processing resources that are used to traverse a determination path. For example, the efficiency score may be based on the number of intermediate tables between a source determination object at the source table and the target determination object at the target table. The accuracy score may reflect the number of records from the source table that can be accurately related to the target a particular determination path. For example, not all of the records in the source table, the target table, or the intermediate tables may be filled. If a record is not filled, then the chain from a source determination object to the target determination object may be broken, preventing the record identification system from traversing the determination path. The accuracy score may be an indication of the number of records from the source table that can be accurately related to the target determination object based on the filled and unfilled records at the source table, the target table, and any intermediate tables.

In some examples, the record identification system may be further programmed to utilize the set of determination paths and additional data to generate an additional prompt to the trained computerized model. The trained computerized model may be executed to respond to the additional prompt by determining a best fit determination path.

FIG. 1 is a diagram showing one example of an environment 100 including a record identification system 102 and an ERP system 104. The ERP system 104 comprises an ERP application 118, a DBMS 120, and a data store 122. The ERP application 118 may be any suitable ERP application such as, for example, an operations management application, a human resources application, an accounting application, and/or the like. Example ERP applications include an analytics software solution such as the SAP® Analytics Cloud application available from SAP SE of Walldorf, Germany, a human capital management software solution such as SAP SuccessFactors®, also available from SAP SE of Walldorf, Germany, a project management software solution such as SAP Portfolio and Project Management (PaPM), also available from SAP SE of Walldorf, Germany. Also, although a single ERP application 118 is shown in FIG. 1, it will be appreciated that the ERP system 104 may execute multiple ERP applications.

The DBMS 120 may manage a database with data stored at the data store 122. Data at the data store 122 may be managed by the DBMS 120 according to a schema 105. The schema 105 may describe various tables and relationships therebetween. The example of FIG. 1 shows example tables 124, 126, 128, 130, 132, 134 and relationships therebetween. It will be appreciated, however, that the schema 105 may comprise any suitable number of tables having any suitable set of relationships with one another. In some examples, the ERP application 118 and DBMS 120 include an executable code that is executed at the ERP system 104.

The record identification system 102 may comprise various subsystems including, for example, an interface system 106 for interfacing with users 142, 144, 146 and/or the ERP system 104, a database migration/update system 108 for performing and/or managing data migrations or updates at the ERP system 104, a trained computerized model 112 for discovering determination paths and/or determining a best fit determination path, and a prompt generator system 110 for utilizing knowledge data 114 and/or shipped relationship data 116 to generate one or more prompts for the trained computerized model 112.

Users 142, 144, 146 may access the ERP system 104 and/or the record identification system 102. The users 142, 144, 146 may access the systems 102, 104 utilizing user computing devices 136, 138, 140. The user computing devices 136, 138, 140 may be any suitable computing device such as, for example, a mobile computing device, a laptop computing device, a desktop computing device, and the like. In some examples, users 142, 144, 146 may access the ERP system 104 to utilize functionality of the ERP application 118. Some or all of the users 142, 144, 146 may also utilize the record identification system 102, for example, to implement a data migration, system updates, and/or to otherwise identify records at the DBMS 120 that are associated with a target determination object. Users 142, 144, 146 may be associated with a customer enterprise utilizing the ERP system 104 and/or with a software provider providing the ERP system 104 to the customer enterprise.

In some examples, the ERP system 104 is implemented in a cloud environment, such as, for example, a public cloud environment or a private cloud environment. In a private cloud environment, the customer enterprise may provide executables and other files to implement the ERP system 104. In a public cloud environment, users associated with the customer enterprise are provided with access to the ERP system 104 through one of a number of tenancies. A software provider enterprise may provide executables and other files to implement the ERP system 104 and, in some examples, may also maintain the ERP system 104 and the various tenancies. In some examples, the ERP system 104 is an on-premises system implemented, for example, by the customer enterprise. The record identification system 102 may be implemented in a cloud environment and/or an on-premises system. In some examples, the record identification system 102 is implemented at the same cloud environment and/or on-premises system as the ERP system 104.

Referring to the record identification system, an interface system 106 may be programmed to interface between users 142, 144, 146 and the record identification system 102 and/or the ERP system 104. For example, the interface system 106 may receive requests from one or more of the users 142, 144, 146. Requests may describe, for example, a source table or tables managed by the DBMS 120 and a target determination object. For example, a user 142, 144, 146 may request all records associated with the target determination object from the indicated source table or tables.

The database migration/update system 108 may be configured to implement a migration or update of the ERP application 118 and/or the DBMS 120. For example, the database migration/update system 108 may be programmed to migrate data from another DBMS (not shown) to the DBMS 120. In some examples, the database migration/update system 108 is programmed to delete records associated with the DBMS 120. For example, if the enterprise has divested or otherwise deactivated a subunit, the database migration/update system 108 may delete records associated with the divested subunit.

The record identification system 102 may be programmed to identify records associated with a particular target determination object. Upon receiving a request (e.g., from a user 142, 144, 146 or from the database migration/update system 108), the record identification system 102 may utilize the prompt generator system 110 and trained computerized model 112 to identify a best fit determination path.

The record identification system 102 may be programmed to initially review shipped relationship data 116. Shipped relationship data 116 is data describing determination paths between commonly used determination objects. The shipped relationship data 116 may be generated, for example, by the software provider of the ERP system 104 and may be based on knowledge of the customer organization and/or other determination objects known at the time that the software for the ERP system 104 is shipped. If the shipped relationship data 116 includes a determination path between the one or more source tables indicated by the request, then the record identification system 102 may return the indicated determination path. The indicated determination path may be returned to the requesting user 142, 144, 146 and/or to the database migration/update system 108, which may perform further operations using the determination path. In some examples, the record identification system 102 is programmed to use the indicated determination path to identify records at the source table or tables that are associated with the target determination object. An indication of the identified records may be returned to the user 142, 144, 146 and/or to the database migration/update system 108.

If the record identification system 102 does not find a determination path at the shipped relationship data 116, it may be programmed to utilize the prompt generator system 110 and trained computerized model 112 to identify a set of determination paths from the source table or tables to the target determination object.

The trained computerized model 112 may be utilized to generate the set of determination paths. In some examples, the trained computerized model 112 is a large language model (LLM). An LLM is a computerized model that is trained to recognize and predict patterns in language or other groupings of alphanumeric characters. An LLM may be structured, for example, using a neural network arranged according to a transformer structure. Example LLM's that may be used include the ChatGPT LLM available from OpenAI, the Large Language Model Meta AI (Llama) available from MetaAI, the Gemini LLM available from Google LLC, and/or the like.

LLMs may be well-suited to identifying linguistic relationships such as, for example, relationships between determination objects such as subunits of the business enterprise. An LLM, however, may be limited by its training data. That is, for example, an LLM may not be as well-suited to identify relationships between determination objects where the relationships are based on data generated or modified after the training of the LLM and therefore not reflected in the training data used to train the LLM. This may be addressed by retraining the LLM. It may not be efficient to retrain the LLM each time that new data related to the DBMS 120 or schema 105 is obtained. Accordingly, in various examples, the prompt generator system 110 may be used in conjunction with knowledge data 114 to generate a prompt to the trained computerized model 112 where the prompt with provides the trained computerized model 112 new information not reflected in its training data.

The prompt generator system 110, in various examples, is arranged to implement retrieval augmented generation (RAG). For example, the prompt generator system 110 may access knowledge data 114. The knowledge data 114 comprises knowledge about the schema 105 including the relationships between various potential determination objects represented by columns managed by the DBMS 120. The knowledge data 114 may be provided by the customer enterprise, by the software provider, and/or by other parties. In some examples, the knowledge data 114 is arranged in a knowledge graph format. In a knowledge graph format, relationships between concepts represented in the knowledge graph are expressed, for example, graphically and/or textually.

In examples where the determination objects include subunits of the customer enterprise, the knowledge data 114 may describe, for example, companies, company codes, controlling areas, and plants. A company may be an organizational unit having an individual financial statement. Company codes may describe portions of the customer for which a complete, self-contained set of accounts can be drawn up. For example, a company may include one or more company codes. A controlling area may be an organizational unit used to subdivide the customer enterprise from a cost accounting standpoint. For example, a company code may include one or more controlling areas. A plant is a physical facility within a company code. For example, a controlling area may include one or more plants. It will be appreciated that these are just example organizational units for a customer enterprise. Different customer enterprises may utilize different organizational units.

The prompt generator system 110 may utilize the knowledge data 114 to generate prompt data. The record identification system 102 may execute trained computerized model 112 using the prompt data as input. In some examples, the prompt generator system 110 also accesses the DBMS 120 and utilizes the data from the DBMS 120 to generate the prompt data. For example, the prompt generator system 110 may utilize data describing the schema 105 including, for example, the tables thereof and relationships between the tables.

In response to the prompt data, the computerized model 112 may generate a set of determination paths. The set of determination paths may comprise one or more determination path from one or more source determination objects at the source table or tables to the target determination object. In some examples, not all of the determination paths will use the same source object. Consider an example request specifying a source table used by a human resources ERP application comprising a first column for employee facility and a second column for employee department. The example request may also specify a target determination object indicating a customer enterprise division. The trained computerized model 112 may identify a set of determination paths including some determination paths that use employee facility as the source determination object and some determination paths that use employee department as the source determination object.

The set of determination paths may also include direct and/or indirect determination paths. In a direct determination path, a source determination object at the source table is related directly to the target determination object at a target table. Consider again the example source table used by a human resources ERP application. If a target table includes a column indicating employee facility and a column indicating customer enterprise division, then a direct determination path may be generated between the employee facility source determination object at the source table and the customer enterprise division target determination object at the target table.

In an indirect determination path, a source determination object at the source table is related to the target determination object at a target table via one or more intermediate tables. Returning to the example source table used by the human resources ERP application, consider an example in which a first intermediate table comprises a column indicating employee facility and a column indicating a cost center. In this example, the target table may comprise a column indicating cost center and a column indicating customer enterprise division. Accordingly, a determination path may include the employee facility as the source object being related to the cost center at the intermediate table. The cost center may, in turn, be related to the customer enterprise division at the target table. Accordingly, the indirect determination path may run from the source table, through the intermediate table, and to the target table.

The record identification system 102 may analyze the set of determination paths to determine a best fit determination path. The best fit determination path may be based on efficiency and accuracy. Efficiency describes the processing resources that are used to identify records using the determination path. For example, the efficiency of a determination path may be described by the number of intermediate determination objects and/or the number of intermediate tables in the determination path.

The accuracy of a determination path indicates the likelihood that the determination path will identify a record at the source table. For example, not all records at the tables of the schema 105 are filled. Also, not all possible determination objects have corresponding records at the tables of the schema 105. A determination path may break if an appropriate record is not included at the target table and/or any of the intermediate tables. The accuracy of a determination path may indicate, for example based on the number of filled records, how likely the determination path is to identify records at the source table corresponding to the target determination object.

Consider the example determination path given by Expression [1] below:

$$S \rightarrow I_1/I_1 \rightarrow I_2/I_2 \rightarrow T \qquad [1]$$

In this example, a source determination object S at a source table is related to a first intermediate determination object $I_1$ at a first intermediate table. The first intermediate determination object $I_1$ is related to a second intermediate determination object $I_2$ at a second intermediate table. The second intermediate determination object $I_2$ is related to the target determination object T at the target table. In this example, there are 50 records at the source table. Of those 50 records, 40 have corresponding records at the first intermediate table relating values of the first intermediate determination object $I_1$ to values of the source determination object S. Accordingly, 40 of the records are filled.

Of the 40 filled records at the first intermediate table, 35 have corresponding records at the second intermediate table relating values of the first intermediate determination object $I_1$ to values of the second intermediate determination object $I_2$. Of the 35 records at the second intermediate table, 33 have corresponding records at the target table relating values of the second intermediate determination object $I_2$ to values of the target determination object T. Accordingly, the accuracy of the determination path given by Expression [1], given the numbers of filled records in this example, may be 32/50. The record identification system 102 may be programmed to select the determination path having the most favorable combination of efficiency and accuracy as the best fit determination path.

In some examples, the record identification system 102 may utilize the trained computerized model 112 to identify the best fit determination path from the set of determination paths. In some examples, the prompt generator system 110 may be utilized to generate prompt data prompting the trained computerized model 112 to determine the best fit determination path. The prompt data may incorporate data from the knowledge data 114, data describing the schema 105, and/or any other suitable data. The trained computerized model 112 may be executed using the prompt data to generate the best fit determination path.

In some examples, upon determining a best fit determination path, the record identification system 102 may generate a corresponding API 150. The API 150 corresponding to a determination path may comprise an interface allowing a user 142, 144, 146 and/or the ERP application 118 to request identification of records at the source table or tables corresponding to the target object. Accordingly, the next time that a user 142, 144, 146 or the ERP application 118 is to identify records at the source table or tables corresponding to the same target object, the user 142, 144, 146 or ERP application 118 may make an appropriate call to the appropriate API 150 in lieu of recalculating the best fit determination path using the record identification system 102.

In some examples, the record identification system 102, interface system 106, database migration/update system 108, prompt generator system 110, and trained computerized model 112 may comprise executable code and associated data that may be executed at a suitable computing system to perform the operations described herein.

Figure 2:
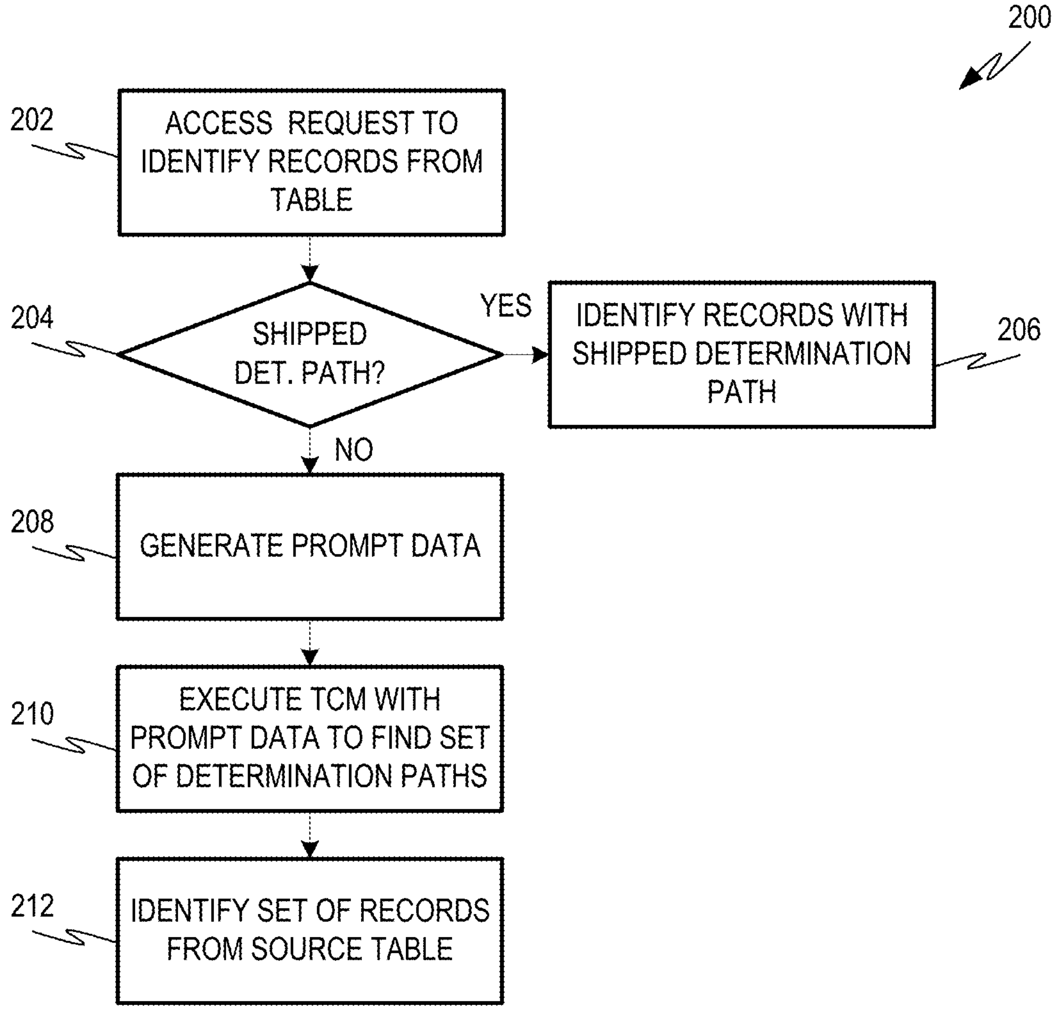
FIG. 2 is a flowchart describing an example process flow that may be executed in the environment of FIG. 1 to identify a set of records from a source table corresponding to a target determination object.

FIG. 2 is a flowchart describing an example process flow 200 that may be executed in the environment 100 of FIG. 1 to identify a set of records from a source table corresponding to a target determination object. In some examples, the process flow 200 may be executed at the record identification system 102.

At operation 202, the record identification system 102 may access a request to identify records from one or more source tables. The request may be accessed in the form of request data describing the one or more source tables and a target determination object. In some examples, the request data may be derived from a request made through the interface system 106 by a user 142, 144, 146. Also, in some examples, the request data may be derived from a request generated by the database migration/update system 108 in the course of performing a data migration and/or update, for example, as described herein.

At operation 204, the record identification system 102 may determine if the shipped relationship data 116 describes a determination path relating at least one determination object represented by a column of the source table or tables to the target determination object. If the shipped relationship data 116 includes such a determination path, the record identification system 102 may, space at operation 206, identify the requested records using the determination path from the shipped relationship data 116.

If the shipped relationship data 116 does not include a determination path responsive to the request, then the record identification system 102 may generate prompt data at operation 208. This may include, for example, utilizing knowledge data 114 to generate a prompt for the trained computerized model 112, prompting the trained computerized model 112 to return a set of determination paths. At operation 210, the record identification system 102 may execute the trained computerized model 112 to return the set of determination paths. The returned set of determination paths may include determination paths relating a source object from the one or more source tables to the determination object either directly or via one or more intermediate tables.

At operation 212, the record identification system 102 may identify a set of records from the source table or tables that are associated with the target determination object utilizing the set of determination paths returned by the trained computerized model 112. This may include, in some examples, determining a best fit determination path using an accuracy score and efficiency score for each determination path, as described herein. In some examples, this may include using the trained computerized model 112 to determine a best fit determination path, also as described herein.

The record identification system 102 may traverse the best fit determination path to tie each record at the source table or tables (or all records for which the determination path is complete or accurate) to determine records at the source table or tables that are associated with the target determination object. For example, the record identification system 102 may read a first record from the source table or tables. The record identification system 102 may identify a source value of the record corresponding to a source column of the source table. The record identification system 102 may utilize the source value to find a target value from a target column of the target table. The record identification system 102 may utilize the source value to directly identify the target column of the target table and/or may utilize one or more intermediate tables, as described herein. The target column may correspond to the target determination object. If the target value matches the target determination object, then the record is identified as relating to the target determination object.

Figure 3:
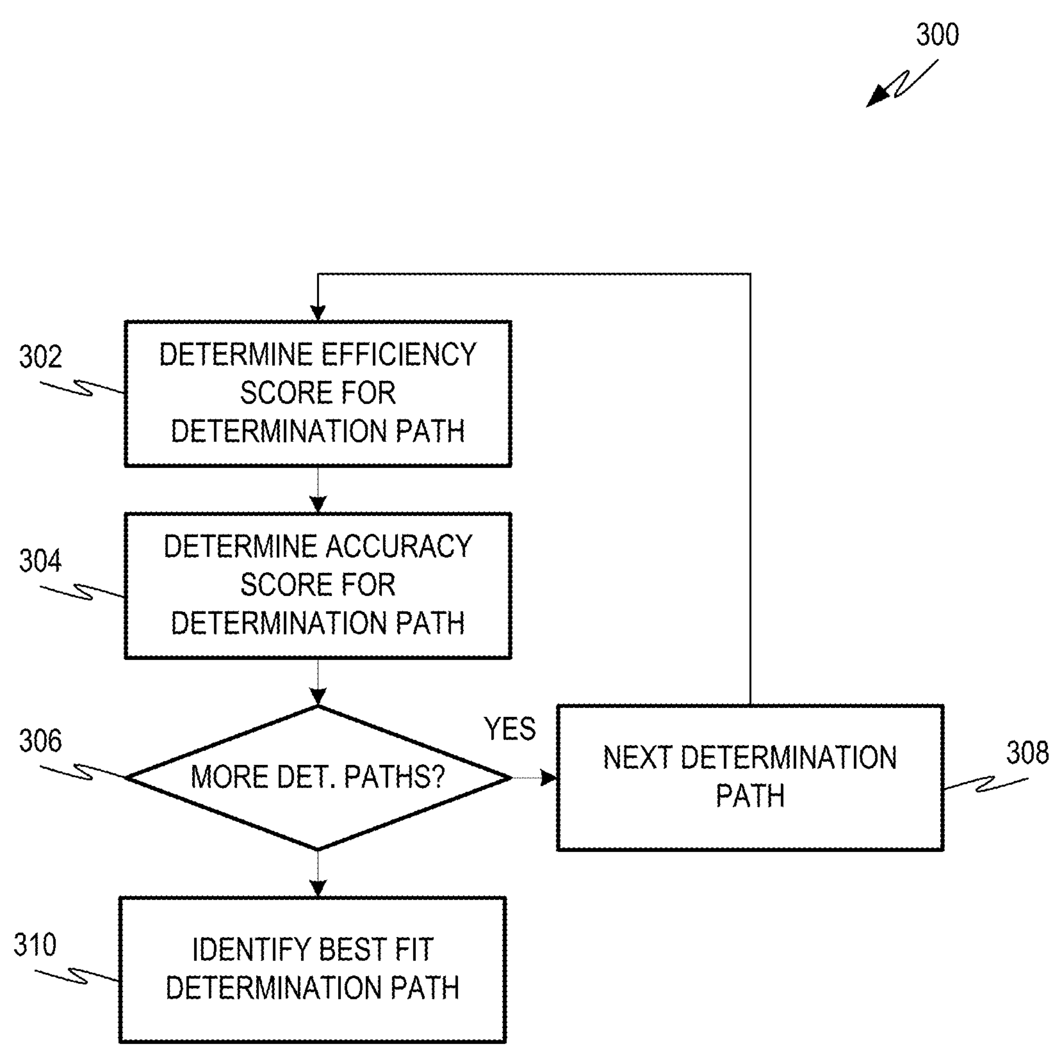
FIG. 3 is a flowchart describing an example process flow that may be executed in the environment of FIG. 1 to identify a best fit determination path from a set of determination paths.

FIG. 3 is a flowchart describing an example process flow 300 that may be executed in the environment 100 of FIG. 1 to identify a best fit determination path from a set of determination paths. In some examples, the process flow 300 may be executed as part of the operation 212 of the process flow 200 described herein.

At operation 302, the record identification system 102 may determine and efficiency score for a determination path from the set of determination paths. The efficiency score may describe the number of intermediate determination objects and/or intermediate tables in the determination path. In some examples, the efficiency score indicates the processing resources that would be used to identify records from the source table or tables to a particular value of the determination object.

At operation 304, the record identification system 102 may determine an accuracy score for a determination path from the set of determination paths. The accuracy score may describe the number of records at the source table or tables that can be tied to a value of the target determination object based on the state of the target table and/or the intermediate tables.

At operation 306, the record identification system 102 may determine if there are any additional determination paths from the set of determination paths that have not yet been considered. If there are additional determination paths, the record identification system 102 may move to the next determination path at operation 308 and return to operation 302.

If all determination paths have been considered, the record identification system 102 may use the efficiency and accuracy scores for the respective determination paths to identify the best fit determination path at operation 310. In some examples, the best fit determination path has the highest combination of efficiency score and accuracy score from among the set of determination paths. In some examples, efficiency score and/or accuracy score may be weighted to generate a weighted composite score. The determination path from the set of determination paths with the highest weighted composite score may be the best fit determination path.

Figure 4:
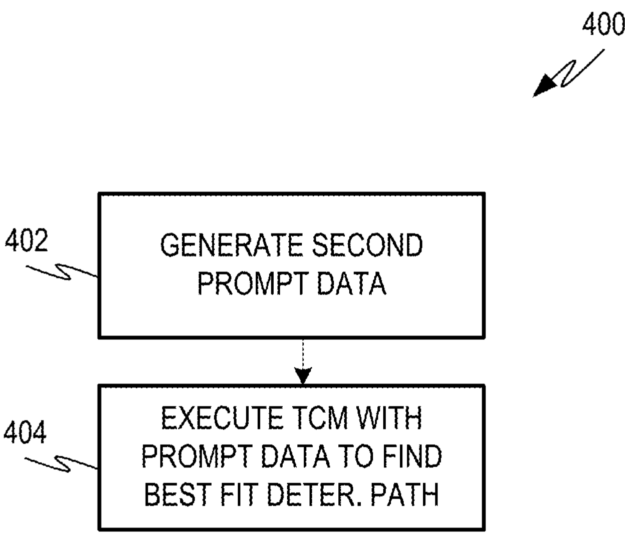
FIG. 4 is a flowchart describing another example process flow 400 that may be executed in the environment of FIG. 1 to identify a best fit determination path from a set of determination paths.

FIG. 4 is a flowchart describing another example process flow 400 that may be executed in the environment 100 of FIG. 1 to identify a best fit determination path from a set of determination paths. At operation 402, the record identification system 102 (e.g. the prompt generator system 110 thereof) may generate prompt to data for the trained computerized model 112. The generated prompt data may prompt the trained computerized model 112 to determine a best fit determination path from the set of determination paths. In some examples, the prompt generator system 110 may implement a retrieval augmented generation (RAG) technique utilizing the set of determination paths and/or other data such as, for example, data describing the schema 105 used by the DBMS 120, knowledge data 114, shipped relationship data 116, and/or the like. At operation 404, the record identification system 102 may execute the trained computerized model 112 with the prompt data generated at operation 402. As a result, the trained computerized model 112 may generate an indication of a best fit determination path.

Figure 5:
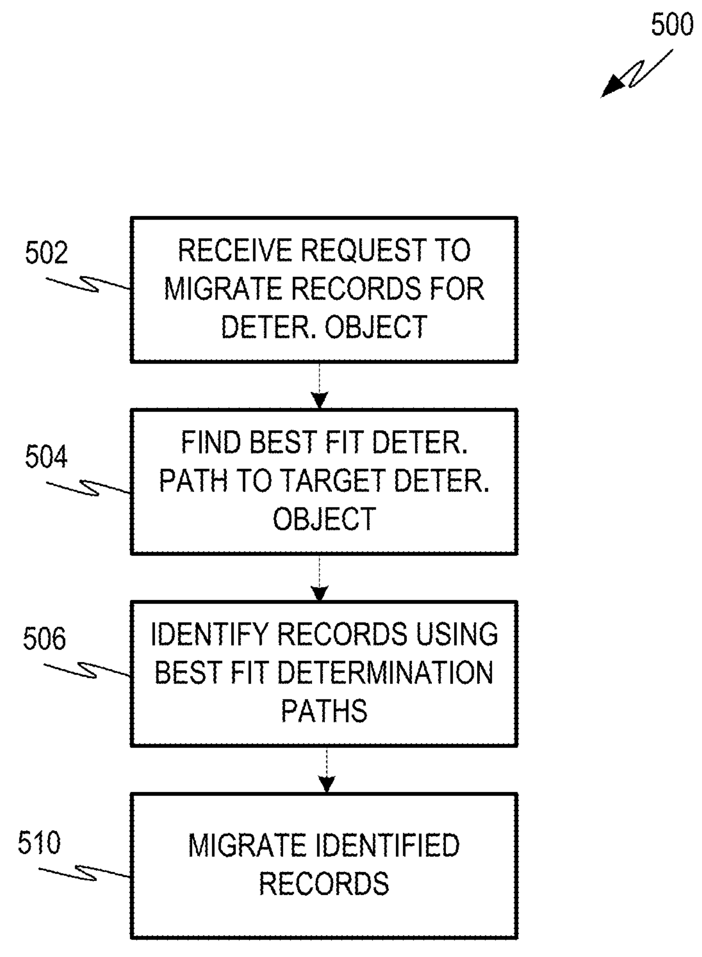
FIG. 5 is a flowchart showing one example of a process flow that may be executed in the environment of FIG. 1 to perform a data migration.

FIG. 5 is a flowchart showing one example of a process flow 500 that may be executed in the environment 100 of FIG. 1 to perform a data migration. The data migration may be between a source database and a target database. The target database may be, for example, the DBMS 120.

At operation 502, the record identification system 102 (e.g., the database migration/update system 108 thereof) may receive a request to migrate records for an indicated target determination object. The request may indicate a source table or tables from which the records are to be migrated and a destination table or tables where the migrated records are to be written and a target determination object. In some examples, the target determination object is a subunit of an enterprise and the purpose of the request is to migrate records associated with the subunit of the enterprise to the destination table or tables.

At operation 504, the record identification system 102 may determine the best fit determination path from the source table or tables to the target determination object. This may be performed, for example, as described herein with respect to any suitable combination of process flows 200, 300, and/or 400. At operation 506, the record identification system 102 may utilize the best fit determination path to identify a set of records from the source table or tables that are associated with the target determination object. At operation 510, the record identification system 102 may migrate the identified records to the destination table or tables. This may include, for example, copying the identified records to the destination table or tables. In some examples, this also includes deleting the identified records from the source table or tables.

Figure 6:
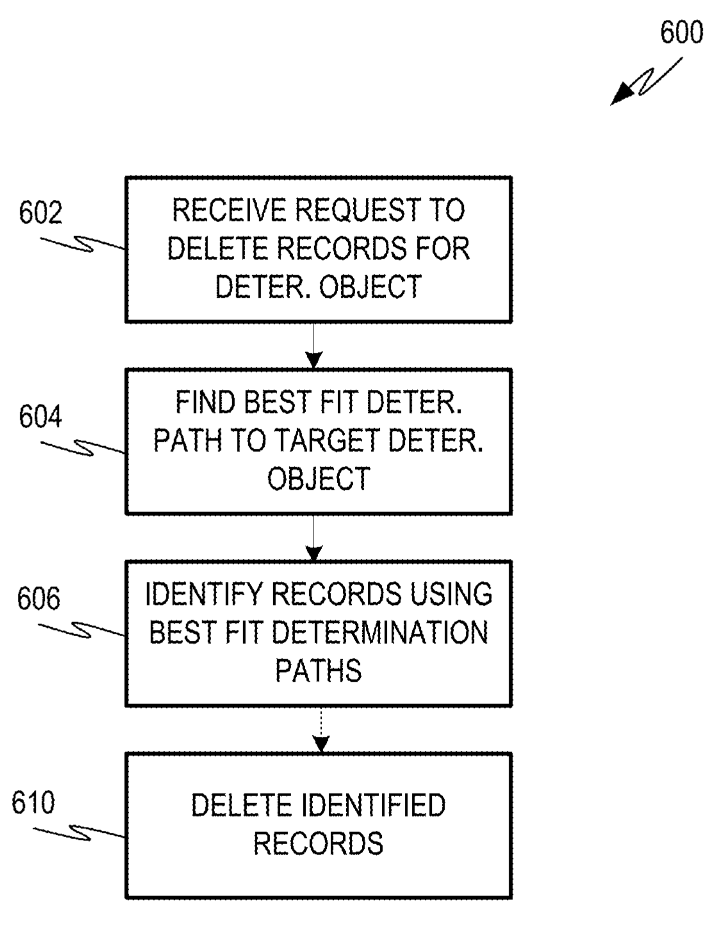
FIG. 6 is a flowchart showing one example of a process flow that may be executed in the environment of FIG. 1 to delete records corresponding to a target determination object.

FIG. 6 is a flowchart showing one example of a process flow 600 that may be executed in the environment 100 of FIG. 1 to delete records corresponding to a target determination object. At operations 602, the record identification system 102 (e.g. the database migration/update system 108 thereof) may receive a request to delete records for an indicated target determination object. In some examples, the target determination object is a subunit of an enterprise that has been divested, disbanded, or otherwise is no longer in use.

At operation 604, the record identification system 102 may determine the best fit determination path from the source table or tables to the target determination object. This may be performed, for example, as described herein with respect to any combination of process flows 200, 300, and/or 400. At operation 606, the record identification system 102 may utilize the best fit determination path to identify a set of records from the source table or tables that are associated with the target determination object. At operation 610, the record identification system 102 may delete the identified sets of records from the source table or tables.

In view of the disclosure above, various examples are set forth below. It should be noted that one or more features of an example, taken in isolation or combination, should be considered within the disclosure of this application.

EXAMPLES

Example 1 is a system of identifying records at a database corresponding to a target determination object, the system comprising: at least one processor programmed to perform operations comprising: accessing request data, the request data indicating a source table at the database and a target determination object; using stored knowledge data, generating first prompt data, the first prompt data comprising at least one prompt to be provided to a trained computerized model to cause the trained computerized model to return a set of determination paths to the target determination object; executing the trained computerized model using the first prompt data to generate the set of determination paths, the set of determination paths comprising a first determination path relating a source determination object corresponding to a source column of the source table and the target determination object corresponding to a target column of a target table different than the source table; and determining a set of records from the source table that are associated with the target determination object using the set of determination paths.

In Example 2, the subject matter of Example 1 optionally includes the set of determination paths comprising a plurality of determination paths, the operations further comprising: determining a respective efficiency score for each of the plurality of determination paths; determining a respective accuracy score for each of the plurality of determination paths; and determining that the first determination path is a best fit determination path, the determining being based on the respective efficiency scores for each of the plurality of determination paths and the respective accuracy scores for each of the plurality of determination paths.

In Example 3, the subject matter of Example 2 optionally includes the efficiency score for the first determination path being based at least in part on a number of intermediate tables on the first determination path between the source table and the target table.

In Example 4, the subject matter of any one or more of Examples 2-3 optionally includes wherein the determining of the respective efficiency score is based on a portion of filled record fields along the set of determination paths.

In Example 5, the subject matter of any one or more of Examples 1-4 optionally includes the set of determination paths comprising a plurality of determination paths, the operations further comprising: using the set of determination paths and at least the source table and the target table of the database, generating second prompt data, comprising at least one prompt to be provided to the trained computerized model to cause the trained computerized model to return a best fit determination path from the set of determination paths; and executing the trained computerized model using the second prompt data to determine that the first determination path is the best fit determination path.

In Example 6, the subject matter of Example 5 optionally includes the determining of the set of records from the source table comprising, for each record in the source table: reading a source value from a field of the record corresponding to the source column of the source table; using the source value to access a target value from the target column of the target table; and determining that the target value corresponds to the target determination object.

In Example 7, the subject matter of any one or more of Examples 1-6 optionally includes the source determination object being associated with the target determination object at the target table.

In Example 8, the subject matter of any one or more of Examples 1-7 optionally includes the source determination object being associated with an intermediate object at a third table, the intermediate object at the third table being associated with the target determination object at the target table.

Example 9 is a method of identifying records at a database corresponding to a target determination object, the method comprising: accessing request data, the request data indicating a source table at the database and a target determination object; using stored knowledge data, generating first prompt data, the first prompt data comprising at least one prompt to be provided to a trained computerized model to cause the trained computerized model to return a set of determination paths to the target determination object; executing the trained computerized model using the first prompt data to generate the set of determination paths, the set of determination paths comprising a first determination path relating a source determination object corresponding to a source column of the source table and the target determination object corresponding to a target column of a target table different than the source table; and determining a set of records from the source table that are associated with the target determination object using the set of determination paths.

In Example 10, the subject matter of Example 9 optionally includes the set of determination paths comprising a plurality of determination paths, the method further comprising: determining a respective efficiency score for each of the plurality of determination paths; determining a respective accuracy score for each of the plurality of determination paths; and determining that the first determination path is a best fit determination path, the determining being based on the respective efficiency scores for each of the plurality of determination paths and the respective accuracy scores for each of the plurality of determination paths.

In Example 11, the subject matter of Example 10 optionally includes the efficiency score for the first determination path being based at least in part on a number of intermediate tables on the first determination path between the source table and the target table.

In Example 12, the subject matter of any one or more of Examples 10-11 optionally includes wherein the determining of the respective efficiency score is based on a portion of filled record fields along the set of determination paths.

In Example 13, the subject matter of any one or more of Examples 9-12 optionally includes the set of determination paths comprising a plurality of determination paths, the method further comprising: using the set of determination paths and at least the source table and the target table of the database, generating second prompt data, comprising at least one prompt to be provided to the trained computerized model to cause the trained computerized model to return a best fit determination path from the set of determination paths; and executing the trained computerized model using the second prompt data to determine that the first determination path is the best fit determination path.

In Example 14, the subject matter of Example 13 optionally includes the determining of the set of records from the source table comprising, for each record in the source table: reading a source value from a field of the record corresponding to the source column of the source table; using the source value to access a target value from the target column of the target table; and determining that the target value corresponds to the target determination object.

In Example 15, the subject matter of any one or more of Examples 9-14 optionally includes the source determination object being associated with the target determination object at the target table.

In Example 16, the subject matter of any one or more of Examples 9-15 optionally includes the source determination object being associated with an intermediate object at a third table, the intermediate object at the third table being associated with the target determination object at the target table.

Example 17 is a non-transitory machine-readable medium comprising instructions thereon that, when executed by at least one processor, because the at least one processor to perform operations comprising: accessing request data, the request data indicating a source table at a database and a target determination object; using stored knowledge data, generating first prompt data, the first prompt data comprising at least one prompt to be provided to a trained computerized model to cause the trained computerized model to return a set of determination paths to the target determination object; executing the trained computerized model using the first prompt data to generate the set of determination paths, the set of determination paths comprising a first determination path relating a source determination object corresponding to a source column of the source table and the target determination object corresponding to a target column of a target table different than the source table; and determining a set of records from the source table that are associated with the target determination object using the set of determination paths.

In Example 18, the subject matter of Example 17 optionally includes the set of determination paths comprising a plurality of determination paths, the operations further comprising: determining a respective efficiency score for each of the plurality of determination paths; determining a respective accuracy score for each of the plurality of determination paths; and determining that the first determination path is a best fit determination path, the determining being based on the respective efficiency scores for each of the plurality of determination paths and the respective accuracy scores for each of the plurality of determination paths.

In Example 19, the subject matter of any one or more of Examples 17-18 optionally includes the set of determination paths comprising a plurality of determination paths, the operations further comprising: using the set of determination paths and at least the source table and the target table of the database, generating second prompt data, comprising at least one prompt to be provided to the trained computerized model to cause the trained computerized model to return a best fit determination path from the set of determination paths; and executing the trained computerized model using the second prompt data to determine that the first determination path is the best fit determination path.

In Example 20, the subject matter of Example 19 optionally includes the determining of the set of records from the source table comprising, for each record in the source table: reading a source value from a field of the record corresponding to the source column of the source table; using the source value to access a target value from the target column of the target table; and determining that the target value corresponds to the target determination object.

Figure 7:
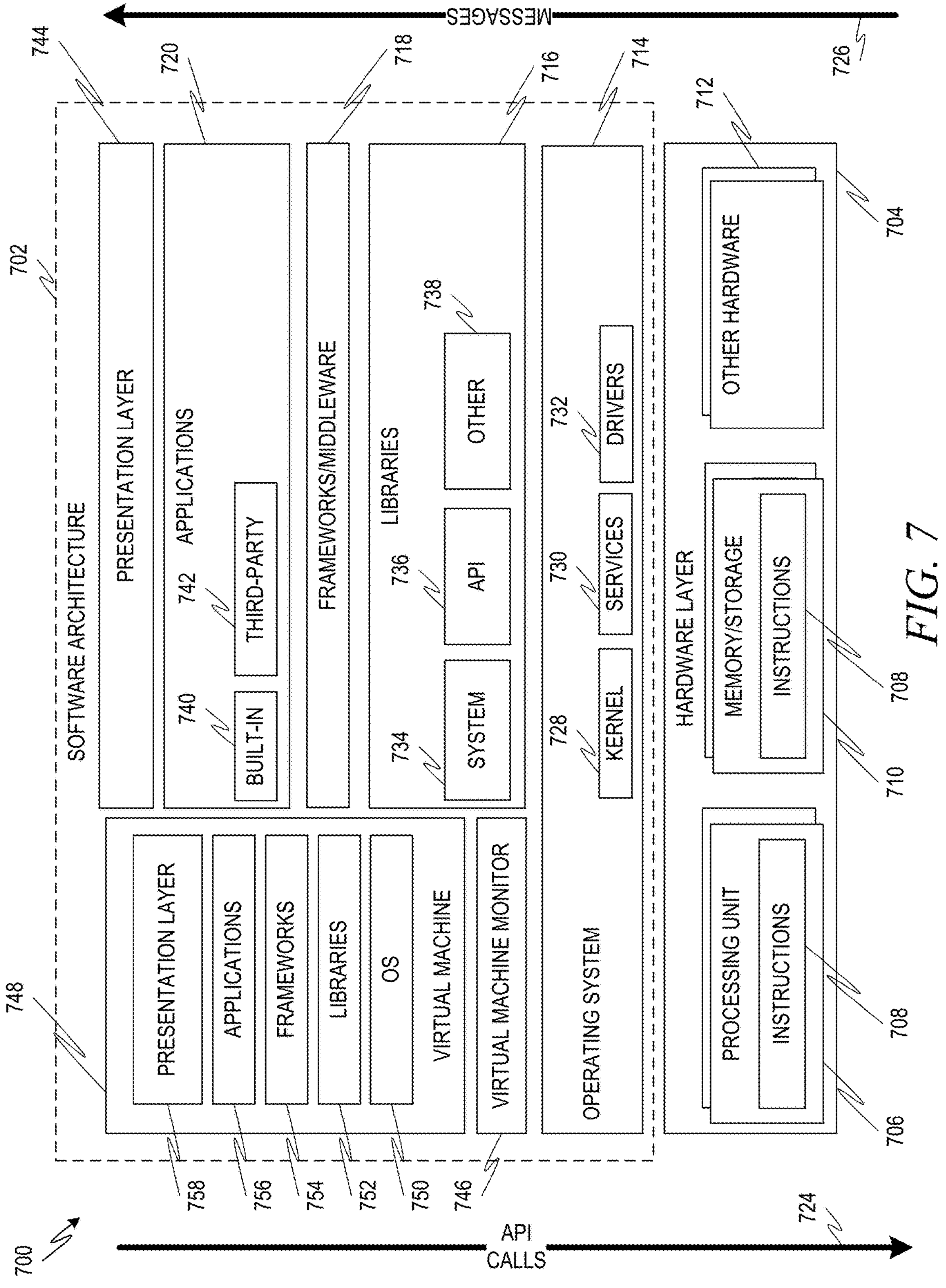
FIG. 7 is a block diagram showing one example of an architecture for a computing device.

FIG. 7 is a block diagram 700 showing one example of a software architecture 702 for a computing device. The architecture 702 may be used in conjunction with various hardware architectures, for example, as described herein. FIG. 7 is merely a non-limiting example of a software architecture and many other architectures may be implemented to facilitate the functionality described herein. A representative hardware layer 704 is illustrated and can represent, for example, any of the above referenced computing devices. In some examples, the hardware layer 704 may be implemented according to the architecture of the computer system of FIG. 8.

The representative hardware layer 704 comprises one or more processing units 706 having associated executable instructions 708. Executable instructions 708 represent the executable instructions of the software architecture 702, including implementation of the methods, modules, subsystems, and components, and so forth described herein, and may also include memory and/or storage modules 710, which also have executable instructions 708. Hardware layer 704 may also comprise other hardware as indicated by other hardware 712 which represents any other hardware of the hardware layer 704, such as the other hardware illustrated as part of the architecture 702.

In the example architecture of FIG. 7, the software architecture 702 may be conceptualized as a stack of layers where each layer provides particular functionality. For example, the software architecture 702 may include layers such as an operating system 714, libraries 716, middleware layer 718, applications 720, and presentation layer 744. Operationally, the applications 720 and/or other components within the layers may invoke API calls 724 through the software stack and access a response, returned values, and so forth illustrated as messages 726 in response to the API calls 724. The layers illustrated are representative in nature and not all software architectures have all layers. For example, some mobile or special purpose operating systems may not provide a middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The middleware layer 718 (also sometimes referred to as frameworks) may provide a higher-level common infrastructure that may be utilized by the applications 720 and/or other software components/modules. For example, the middleware layer 718 may provide various graphic user interface (GUI) functions, high-level resource management, high-level location services, and so forth. The middleware layer 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 742 may invoke the API calls 724 provided by the mobile operating system such as operating system 714 to facilitate functionality described herein.

The applications 720 may utilize built-in operating system functions (e.g., kernel 728, services 730 and/or drivers 732), libraries (e.g., system 734, API libraries 736, and other libraries 738), and middleware layer 718 to create user interfaces to interact with users of the system. Alternatively, or additionally, in some systems interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware computing device. A virtual machine is hosted by a host operating system (operating system 714) and typically, although not always, has a virtual machine monitor 746, which manages the operation of the virtual machine 748 as well as the interface with the host operating system (i.e., operating system 714). A software architecture executes within the virtual machine 748 such as an operating system 750, libraries 752, frameworks/middleware 754, applications 756 and/or presentation layer 758. These layers of software architecture executing within the virtual machine 748 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 8:
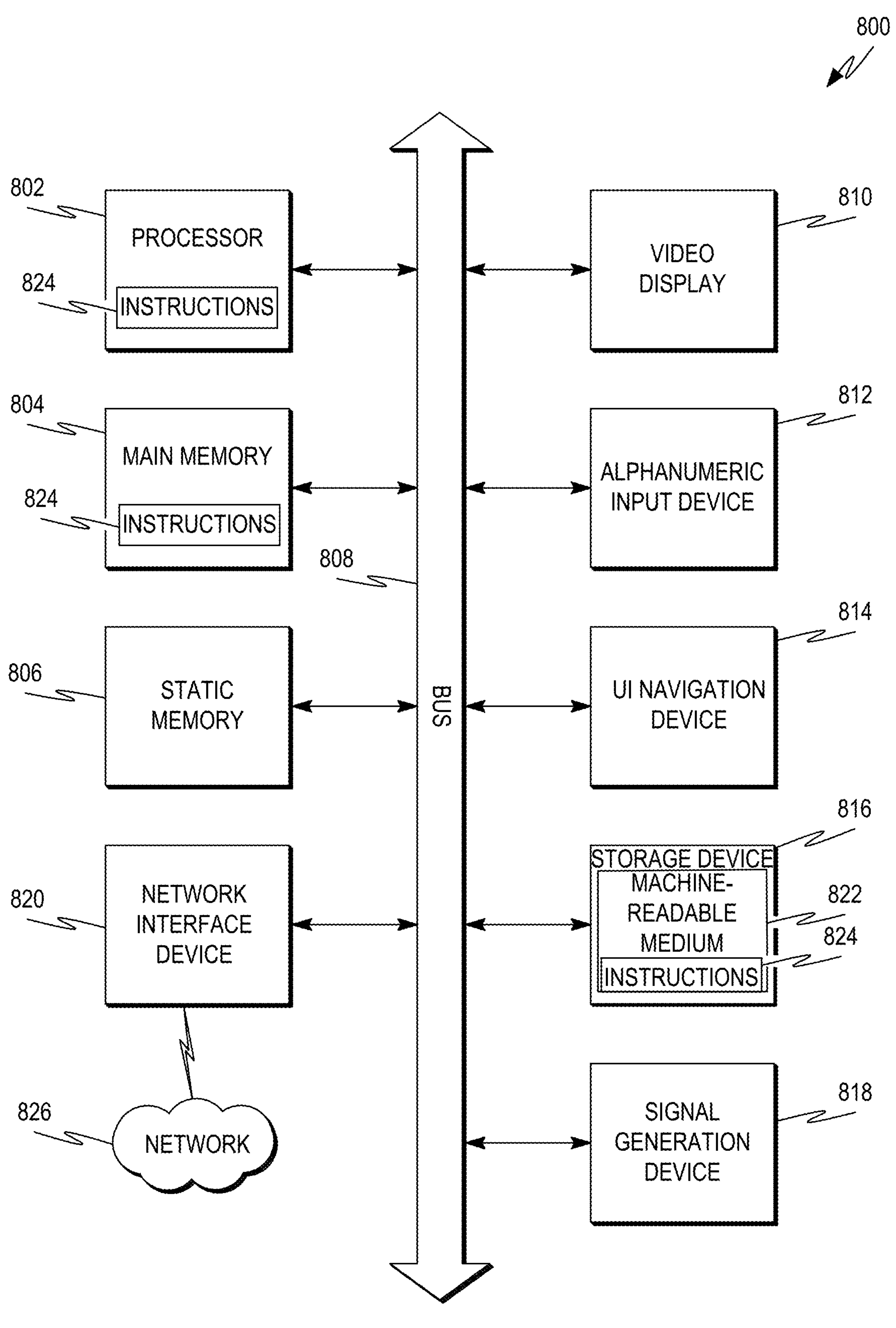
FIG. 8 is a block diagram of a machine in the example form of a computer system within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation (or cursor control) device 814 (e.g., a mouse), a disk drive unit 816, a signal generation device 818 (e.g., a speaker), and a network interface device 820.

Machine-Readable Medium

The disk drive unit 816 includes a machine-readable medium 822 that may have stored thereon one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media 822.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system of identifying records at a database corresponding to a target determination object, the system comprising:

at least one processor programmed to perform operations comprising:

accessing request data, the request data indicating a source table at the database and a target determination object;

using stored knowledge data, generating first prompt data, the first prompt data comprising at least one prompt to be provided to a trained computerized model to cause the trained computerized model to return a set of determination paths to the target determination object;

executing the trained computerized model using the first prompt data to generate the set of determination paths, the set of determination paths comprising a first determination path relating a source determination object corresponding to a source column of the source table and the target determination object corresponding to a target column of a target table different than the source table;

determining a respective efficiency score for each determination path of the set of determination paths;

determining a respective accuracy score for each determination path of the set of determination paths;

determining that the first determination path is a best fit determination path of the set of determination paths, the determining that the first determination path is the best fit determination path being based on the respective efficiency scores for each determination path of the set of determination paths and the respective accuracy scores for each determination path of the set of determination paths; and determining a set of records from the source table that are associated with the target determination object using the first determination path.

2. The system of claim 1, an efficiency score for the first determination path being based at least in part on a number of intermediate tables on the first determination path between the source table and the target table.

3. The system of claim 1, the determining of the respective efficiency score being based on a portion of filled record fields along the set of determination paths.

4. The system of claim 1, the operations further comprising:

using the set of determination paths and at least the source table and the target table of the database, generating second prompt data, comprising at least one prompt to be provided to the trained computerized model to cause the trained computerized model to return the best fit determination path from the set of determination paths; and executing the trained computerized model using the second prompt data to determine that the first determination path is the best fit determination path.

5. The system of claim 4, the determining of the set of records from the source table comprising, for each record in the source table:

reading a source value from a field of the record corresponding to the source column of the source table;

using the source value to access a target value from the target column of the target table; and determining that the target value corresponds to the target determination object.

6. The system of claim 1, the source determination object being associated with the target determination object at the target table.

7. The system of claim 1, the source determination object being associated with an intermediate object at a third table, the intermediate object at the third table being associated with the target determination object at the target table.

8. A method of identifying records at a database corresponding to a target determination object, the method comprising:

accessing request data, the request data indicating a source table at the database and a target determination object;

using stored knowledge data, generating first prompt data, the first prompt data comprising at least one prompt to be provided to a trained computerized model to cause the trained computerized model to return a set of determination paths to the target determination object;

executing the trained computerized model using the first prompt data to generate the set of determination paths, the set of determination paths comprising a first determination path relating a source determination object corresponding to a source column of the source table and the target determination object corresponding to a target column of a target table different than the source table;

determining a respective efficiency score for each determination path of the set of determination paths;

determining a respective accuracy score for each determination path of the set of determination paths;

determining that the first determination path is a best fit determination path of the set of determination paths, the determining that the first determination path is the best fit determination path being based on the respective efficiency scores for each determination path of the set of determination paths and the respective accuracy scores for each determination path of the set of determination paths; and determining a set of records from the source table that are associated with the target determination object using the first determination path.

9. The method of claim 8, an efficiency score for the first determination path being based at least in part on a number of intermediate tables on the first determination path between the source table and the target table.

10. The method of claim 8, the determining of the respective efficiency score being based on a portion of filled record fields along the set of determination paths.

11. The method of claim 8, the method further comprising:

using the set of determination paths and at least the source table and the target table of the database, generating second prompt data, comprising at least one prompt to be provided to the trained computerized model to cause the trained computerized model to return the best fit determination path from the set of determination paths; and executing the trained computerized model using the second prompt data to determine that the first determination path is the best fit determination path.

12. The method of claim 11, the determining of the set of records from the source table comprising, for each record in the source table:

reading a source value from a field of the record corresponding to the source column of the source table;

using the source value to access a target value from the target column of the target table; and determining that the target value corresponds to the target determination object.

13. The method of claim 8, the source determination object being associated with the target determination object at the target table.

14. The method of claim 8, the source determination object being associated with an intermediate object at a third table, the intermediate object at the third table being associated with the target determination object at the target table.

15. A non-transitory machine-readable medium comprising instructions thereon that, when executed by at least one processor, causes the at least one processor to perform operations comprising:

accessing request data, the request data indicating a source table at a database and a target determination object;

using stored knowledge data, generating first prompt data, the first prompt data comprising at least one prompt to be provided to a trained computerized model to cause the trained computerized model to return a set of determination paths to the target determination object;

executing the trained computerized model using the first prompt data to generate the set of determination paths, the set of determination paths comprising a first determination path relating a source determination object corresponding to a source column of the source table and the target determination object corresponding to a target column of a target table different than the source table;

determining a respective efficiency score for each determination path of the set of determination paths;

determining a respective accuracy score for each determination path of the set of determination paths;

determining that the first determination path is a best fit determination path of the set of determination paths, the determining that the first determination path is the best fit determination path being based on the respective efficiency scores for each determination path of the set of determination paths and the respective accuracy scores for each determination path of the set of determination paths; and determining a set of records from the source table that are associated with the target determination object using the first determination path.

16. The non-transitory machine-readable medium of claim 15, the operations further comprising:

using the set of determination paths and at least the source table and the target table of the database, generating second prompt data, comprising at least one prompt to be provided to the trained computerized model to cause the trained computerized model to return the best fit determination path from the set of determination paths; and executing the trained computerized model using the second prompt data to determine that the first determination path is the best fit determination path.

17. The non-transitory machine-readable medium of claim 16, the determining of the set of records from the source table comprising, for each record in the source table:

reading a source value from a field of the record corresponding to the source column of the source table;

using the source value to access a target value from the target column of the target table; and determining that the target value corresponds to the target determination object.

* * * * *